May 18, 1943.  L. A. BIXBY  2,319,716
GEAR SHIFTING MEANS
Filed Dec. 20, 1940  3 Sheets-Sheet 3

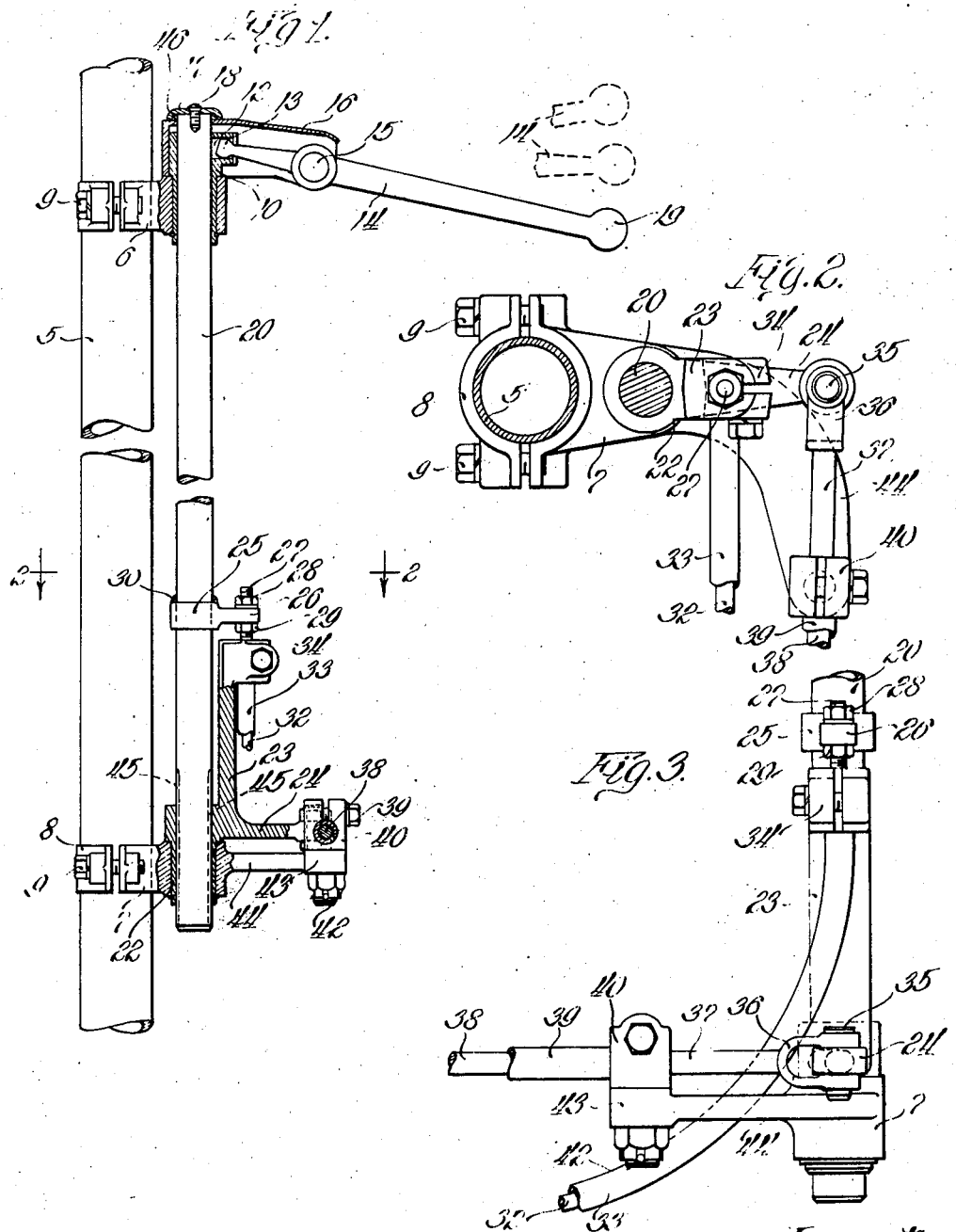

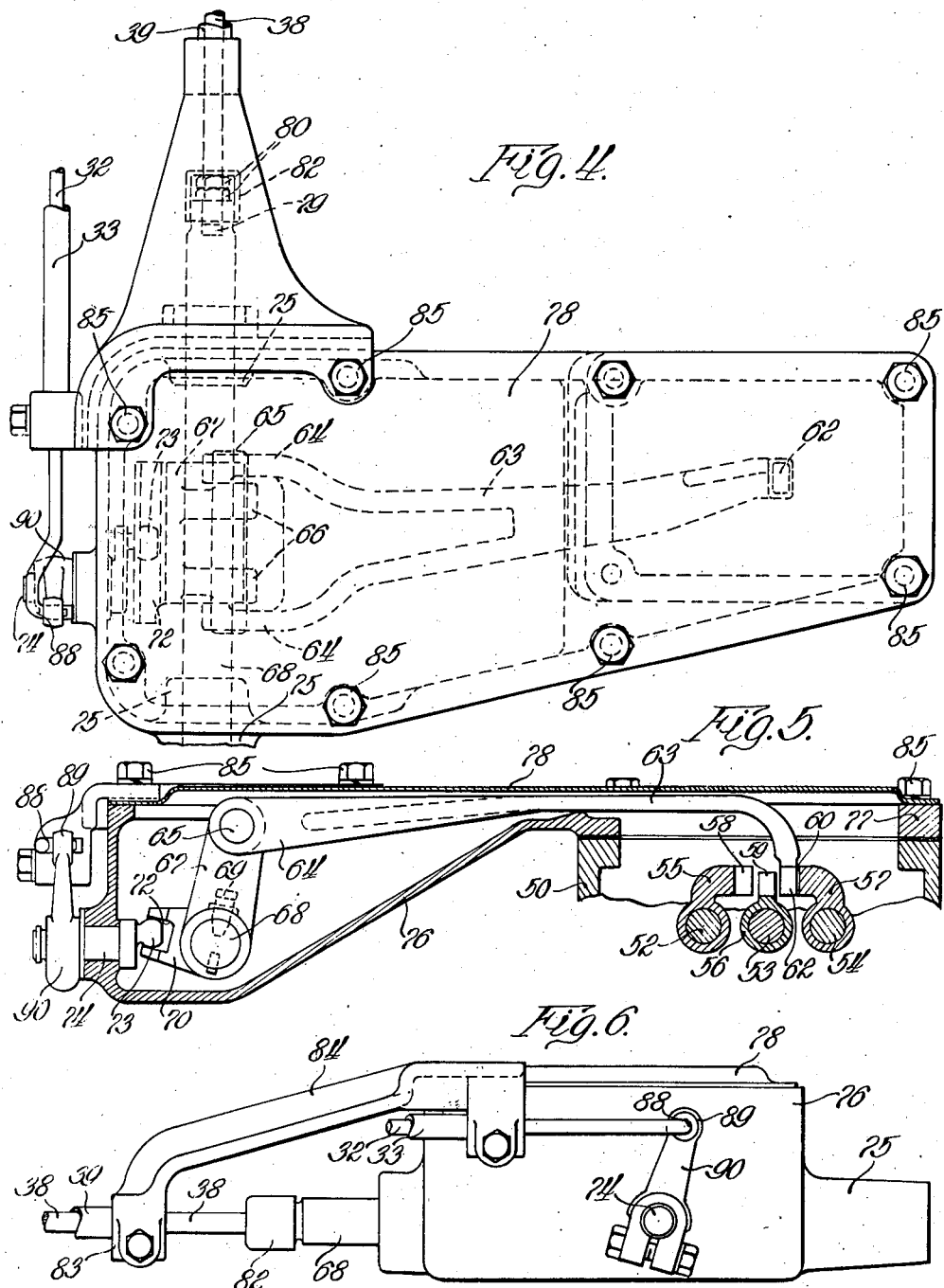

Inventor:
Leo A. Bixby
By Walter E. Skinner
Atty.

Patented May 18, 1943

2,319,716

UNITED STATES PATENT OFFICE 2,319,716

GEAR SHIFTING MEANS

Leo A. Bixby, Niles, Mich., assignor to Clark Equipment Company, Buchanan, Mich., a corporation of Michigan Application December 20, 1940, Serial No. 370,944

12 Claims. (Cl. 74—484)

This invention relates to gear shifting means for transmissions and the like, and is more particularly directed to remotely controlled gear shifting means for controlling the selecting and shifting of gears at a transmission removed from a point of operation of the gear shifting means.

Such a control is shown in general in the co-pending application of Donald S. Dence, Ernest E. Eaton and Robert Lapsley, Serial No. 367,942, filed November 30, 1940, now Patent No. 2,277,-745, issued March 31, 1942, in conjunction with the control of a transmission disposed at a point removed from the operator of the vehicle. Such transmissions are commonly employed in rear engine drive busses, and in certain cases, in cab-over-engine type trucks or double deck busses and the like.

While in some cases it is possible to use a gear shifting mechanism of the type disclosed in the aforesaid application, there are certain installations where a rigid motion-transmitting rod extending from the gear selecting means to the transmission cannot be employed because of the chassis construction and intervening mechanisms which will not allow passage of the rod.

The present construction therefore has as its primary object the provision of a remotely disposed gear shifting and selecting means for the transmission, which is connected to the transmission through flexible motion transmitting elements which are capable of being carried around corners and bent or curved to avoid intervening obstructions of the chassis or other parts of the vehicle.

Another object of the present invention is to provide a simplified gear selecting mechanism which can be mounted upon the steering column or other convenient part of the operator's control cab, and in which the gear selecting and shifting movement is of conventional type so as not to require the operator to learn the new shifting sequence.

Still another object of the present invention is to provide a construction in the transmission whereby an operating shaft which extends parallel to the shift rails of the transmission and is laterally spaced therefrom controls an arm which is operable to effect both selection and shifting of the desired shift rail within the transmission. This operating shaft is adapted to be rotated to provide selecting movement, the rotation being produced by an off-center pin controlled by one flexible motion transmitting element extending between the operation shaft and the gear selecting mechanism. Longitudinal movement of the shaft is provided through a second flexible motion transmitting element connected to the end of the operating shaft and at its opposite end controlled from the gear shifting mechanism.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is an elevational view, partly in section, of the gear shifting and selecting means at the steering column;

Figure 2 is a sectional view taken substantially on line 2—2 of Figure 1;

Figure 3 is an elevational view of the lower portion of the gear shifting and selecting mechanism;

Figure 4 is a top plan view showing the connection of the gear shifting means to the transmission;

Figure 5 is a sectional view through the mechanism shown in Figure 4;

Figure 6 is a side view of the mechanism shown in Figure 4;

Figure 7:
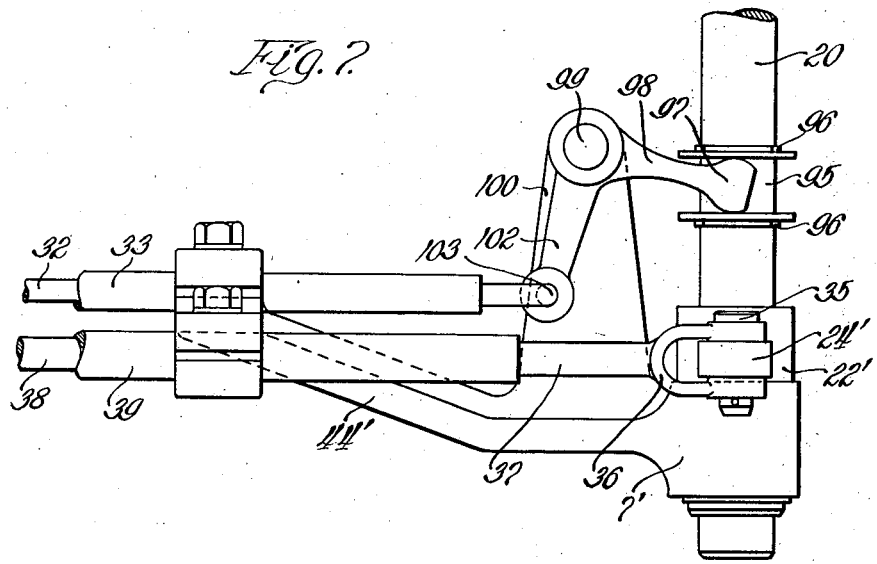
Figure 7 is an elevational view of a modified construction at the lower end of the control rod.

Referring now in detail to the drawings, a steering column or the like is indicated generally at 5 and has mounted thereon at longitudinally spaced points the brackets 6 and 7, each of these brackets being secured in fixed position on the column 5 by means of caps 8 and studs 9.

The upper bracket 6 is provided with a bore through which extends the bushing member 10 having formed therein an outwardly directed arcuate channel portion 12 in which is fulcrumed one end 13 of a gear shifting and selecting lever 14, this lever being pivoted about a pin 15 intermediate its ends, which pin is carried by an arm member 16 extending over the upper end of the bushing 10 and held in firm engagement therewith by means of a cap member 17 screwed as at 18 to the upper end of the shaft. It will be apparent that upon raising movement of the outer end 19 of the lever 14 into the various dotted line positions shown in Figure 1, the lever will fulcrum about its end 13, thereby producing reciprocating movement of the operating rod 20 within the bushing 10 and within a second bushing portion 22 carried in the bracket 7 and having the normally extending arm portions 23 and 24.

Secured to the rod 20 intermediate the brackets 6 and 8 is a collar 25 having an extending arm 26 provided with an opening therethrough adapted to receive the threaded stud 27 held in adjusted position therein by means of the nuts 28 and 29. The collar portion 25 is welded as at 30 integral with the shaft or rod 20 so as to be raised and lowered conjointly therewith, and also to be rotated therewith upon rotation of the rod 20. The stud 27 forms the end of a motion-transmitting rod 32 which is carried within a flexible conduit 33, having its end clasped in the clamp portion 34 at the upper end of the arm 23. Thus it will be seen that upon reciprocating movement of the rod 20 the cable 32 will be reciprocated within the conduit or tubing 33.

The opposite arm 24 of the member 22 terminates at its end in an eye portion adapted to receive a pin 35 securing the clevis 36 thereto. The clevis 36 has a shank portion 37 connected to the flexible motion transmitting rod 38 carried within the conduit or tubing 39, which is firmly grasped at one end within the clamp portion 40 of a clamp member 42 rotatably mounted in a collar portion 43 of an integral arm 44 formed with the bracket 7. It will be apparent that upon rotation of the rod 20 caused by rotating the lever 14 in an arm, the arm 16 at the upper end of the shaft will also be rotated, and since this arm is welded as at 46 to the rod 20, the rod 20 will also rotate. The lower end of the rod is provided with longitudinal splines 45 receiving the bushing portion of the member 22 whereby this member 22 rotates conjointly with the rod 20. This produces rotation of the collar member 25 and of the arm portion 24. Rotation of the arm portion 24 relative to the stationary bracket arm 44 results in imparting push and pull movements to the flexible rod 38 carried in the tubing 39.

Considering now in detail the structure shown in Figures 4 to 6, the transmission housing is indicated generally at 50 and has mounted therein the shift rails 52, 53 and 54 which are supported for longitudinal sliding movement, and which carry suitable shift forks engageable with the transmission gears for axially shifting the gears into and out of engagement. Each of the shift rails is provided wtih a shifter lug 55, 56 and 57, respectively, having notched end portions 58, 59 and 60 adapted to be selectively engaged by the end 62 of an operating arm 63 which extends up beyond the top of the housing 50 and is then bent in a lateral direction, and at its ends, has spaced arm portions 64 receiving a pin 65 pivotally mounting the same upon the ears 66 of a bifurcated arm member 67 rigidly secured to an operating shaft 68, as by means of a set screw 69 or the like. The arm 67 is also provided with a laterally projecting lug portion 70 which is suitably notched, as indicated at 72, to receive the offset pin 73 carried by the rotatable shaft 74. The shaft 68 is supported in suitable bosses 75 formed in an offset housing member 76 having a flange portion 77 bolted or otherwise secured over the open top of the transmission housing 50. A suitable cover plate 78 is secured over the housing portion 76 to close the same.

The end of the operating shaft 68 is adapted to receive the threaded end 79 of the motion transmitting rod 38, this end being coupled to the shaft by means of the nuts 80 and a protecting cap member 82. The end of the tubing 39 enclosing the housing intermediate the steering column and the transmission is clamped in the clamp portion 83 of a bracket arm 84 bolted to the top of the housing by means of the studs 85 which also secure the top plate 78 in position. Thus, it will be seen that longitudinal movement of the rod 38 caused by rotation of the operating rod 20 will result in longitudinal shifting of the shaft 68, which in turn causes transverse movement of the arm 63 thereby shifting the selected rail within the transmission longitudinally. Selection of the desired rod is provided by the motion-transmitting rod 32 which has its end portion provided with the hook 88 extending through an eye 89 carried by an arm 90 clamped to the outer end of the shaft 74. Thus, longitudinal movement of the flexible rod 32 rotates the shaft 74, which in turn moves the pin 73, causing rotation of the arm 67 secured to the operating shaft 68. This shifts the laterally extending arm 63 longitudinally into engagement selectively with the notched ends 58, 59 or 60 of the shift lugs carried by the rails 52, 53 and 54.

It will therefore be apparent that with this construction vertical movement of the shift lever 14 results in reciprocating movement of the rod 20, which in turn moves the flexible member 32 longitudinally within the tubing 33 rotating the arm 90, and thereby providing for selective engagement of the arm 63 within the shift rails in the transmission. Upon the desired shift rail being selected, swinging movement of the lever 14 in a horizontal plane rotates the operating rod 20 which, through the arm 24 and clevis 36, moves the flexible rod 38 longitudinally, thereby shifting the operating shaft 68 longitudinally to move the arm 63 transversely producing corresponding longitudinal shifting movement of the selected shift rail.

Figure 8:
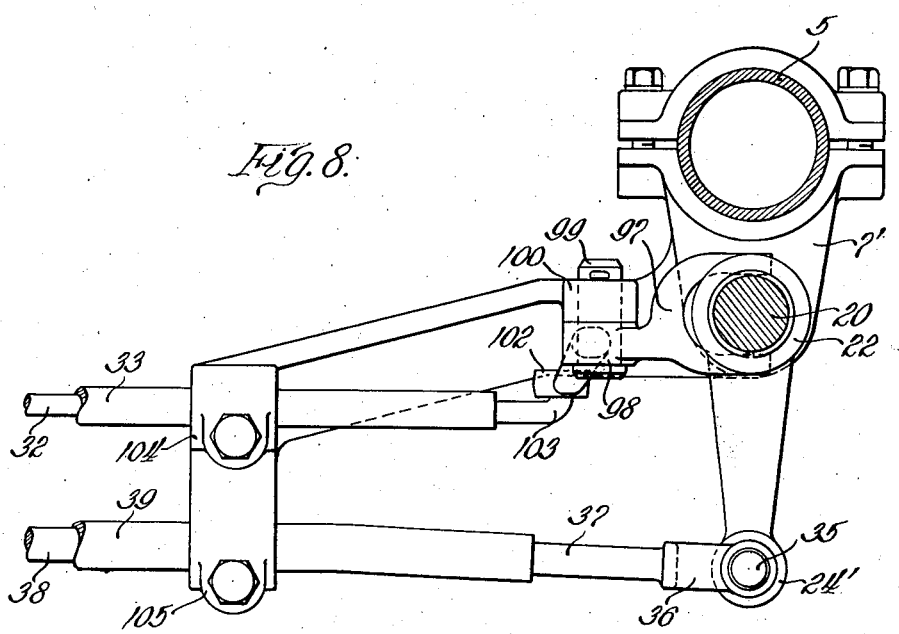
Figure 8 is a top plan view partly in section of the construction shown in Figure 7.

In the form of the invention shown in Figures 7 and 8, a modified construction is employed for the motion transmitting wire 32 insofar as its connection to the control rod 20 is concerned. This eliminates the arcuate bend of this rod indicated in Figure 3 and in place thereof, substitutes a linkage arrangement eliminating any right angle turn in the rod, and thereby reducing the friction during its movement through the conduit 33.

The construction shown in Figures 7 and 8 employs a collar member 95 secured on the rod 20 above the bushing member 22'. The collar is held in position by means of split rings 96 engaging in suitable grooves in the rod 20 to hold the collar fixed against axial movement relative to the rod. Engaging in the collar 20 is the bifurcated end 97 of a bell crank member 98 which is pivoted upon the pin 99 carried by the upstanding arm 100 formed integral with the bracket member 7', which bracket member corresponds to the bracket member 7 of Figures 1 to 3, except that it is provided with the arm 100 forming the pivot for the bell crank 98. The opposite end of the bell crank 98 indicated at 102 receives the hooked end 103 of the motion-transmitting rod 32. The bushing 22' is provided with the arm 24' corresponding to the arm 24 of Figures 1 to 3, which is pivotally connected to the clevis 36, which in turn is connected to the motion-transmitting member 38. The bracket 7' is provided with the laterally projecting and slightly up-turned arm portion 44' which, at its end, is provided with the spaced clamping portions 104 and 105, respectively, which form suitable clamps for holding the conduits 33 and 39, respectively, fixed against longitudinal movement. It will be apparent that upon axial shifting of the control rod 20 for selecting the desired shift rail in the transmission, the bell crank 98 will be rotated about its pivot 99 and, in turn, will impart longitudinal shifting movement to the motion-transmitting member 32 which, at its opposite end is connected to the lever 90 for rotating the eccentric pin 73.

It will be apparent, therefore, that with the modified construction of Figures 7 and 8, the motion transmitting member 32 has the curved portion eliminated, and a direct push and pull upon this rod is imposed through the bell crank member 98. Rotation of the control rod 20 will not affect the operation since the bell crank 98 stays in position with its bifurcated end 97 engaged within the collar 95 at all times.

It is to be understood that the rods 32 and 38 are of flexible material and can be bent into curves or the like to avoid obstructions in the vehicle chassis. Such rods for transmitting tension or compression therethrough are known conventionally as "Bowden" cables, and are well known in the field.

It is therefore believed apparent that I have provided a novel type of gear shifting and selecting means for a remotely disposed transmission which is economical in construction and can be easily assembled for connection to a transmission regardless of its position in the chassis. By the use of the flexible cables, the gear shifting and selecting mechanism can be made up and the cables cut to the desired length to provide connection to the operating shaft 68 regardless of its distance and position with respect to the operating rod 20.

I am aware that various changes may be made in certain details of the present construction, and I therefore do not intend to be limited except as defined by the scope and spirit of the appended claims.

I claim:

1. In combination, a transmission having a forwardly projecting operating shaft, a remotely disposed gear shifting and selecting means for said transmission comprising an operating rod, means including a flexible motion transmitting element connected between said rod and shaft for moving said shaft axially upon rotation of said rod, and a second means including a second flexible motion transmitting element between said rod and shaft for rotating said shaft upon axial shifting of said rod.

2. In combination, a transmission having a gear shifting and selecting shaft mounted in laterally offset position thereon, an eccentric pin operable to rock said shaft for gear selecting movement, a lever for operating said pin, a flexible motion transmitting element selectively operable from a remote point for actuating said lever, and a second flexible motion transmitting element operable from said remote point and connected to one end of said shaft for shifting said shaft axially to produce corresponding shifting of the selected gear in said transmission.

3. In combination, a transmission having a plurality of parallel shift rails, a housing closing the top of said transmission and having a laterally offset portion, a shaft in said offset portion journalled for axial and rotative movement therein, a lever arm secured to said shaft, a transverse arm pivoted at one end to said lever arm and having means at the other end selectively engageable with said rails upon rocking of said shaft, rotatable means extending through the side of said housing having an eccentric engaging said lever arm for rocking the shaft, and flexible motion transmitting means connected to said rotatable means and to the end of said shaft.

4. The combination of claim 3 further characterized in the provision of tubing enclosing said motion transmitting means, and a bracket on said housing for clamping the end of said tubing in fixed position.

5. The combination of claim 3 wherein said motion transmitting means comprises a rod connected to the end of said shaft for axially shifting the same, and a second independent rod connected to said rotatable means.

6. The combination, in a vehicle having a steering column and a remotely disposed transmission having a laterally offset shaft rotatable for selection of a gear therein and shiftable axially for shifting the selected gear, of a control rod pivotally supported on said column, lever means at the upper end thereof for rotating said rod and for axially shifting the same, a bracket at the lower end of said rod rotatable therewith, a bracket on said column fixed against rotation, a bracket at said transmission, flexible tubing elements clamped at one end to said transmission bracket and at the opposite ends to said other brackets, and flexible motion transmitting rods extending through said tubing, one rod being operable upon rotation of said control rod for shifting said offset shaft axially, and the other rod being operable upon longitudinal shifting of said control rod for rotating said offset shaft.

7. In combination, a transmission having a shaft offset laterally therefrom and having means operable upon rotation thereof for selecting gears in said transmission and upon axial shifting for shifting the selected gear, a remotely disposed steering column, a control rod mounted on said column for rotation and axial shifting movement, lever means at one end of said rod for actuating the same, and separate flexible motion transmitting means connected between the lower end of said rod and said shaft for rotating said shaft upon axial shifting of said rod and for shifting said shaft upon rotation of said rod.

8. A remote control gear shifting mechanism for a transmission comprising a rod supported in a pair of longitudinally spaced brackets for rotation and axial shifting movement, the lower one of said brackets having a lateral extension, an arm secured to said rod intermediate said brackets, lever means at the upper end of said rod for actuating the same, a member secured for rotation with said rod adjacent said lower bracket but restrained against axial movement therewith, a flexible motion transmitting rod connected to said arm, a flexible motion transmitting rod connected to said member, a tubing anchored at one end on said member receiving said first flexible rod, and a tubing anchored on said extension receiving said other flexible rod.

9. A transmission adapted to be controlled from a remote point including a plurality of parallel shift rails, a transversely extending arm having means at one end selectively engageable with said rails upon longitudinal movement of said arm, a laterally offset shaft paralleling said rails and having a lever arm portion pivotally connected to the other end of said arm, a rotatable crank engageable with said lever arm portion for rotating said shaft to shift said arm longitudinally, a lever for actuating said crank, and independent flexible motion transmitting means connected to said lever and to said shaft.

10. The transmission of claim 9 including a bracket secured to said transmission and having independent tubing anchored thereto through which said respective motion transmitting means extends.

11. A remote control gear shifting mechanism for a transmission comprising a control rod supported in a pair of longitudinally spaced brackets for rotation and longitudinal shifting movement, a collar on said rod intermediate said brackets, pivotally mounted lever means having one end engaging in said collar for rocking said lever means upon longitudinal shifting of said rod, an arm mounted for conjoint rotation with said rod at the lower end thereof, a pair of flexible tubular conduits, an extension on the lower bracket clamping said conduits against movement, and flexible motion transmitting rods in each conduit connected to said arm and the said lever means.

12. A remote control gear shifting mechanism for a transmission comprising a control rod supported in a pair of longitudinally spaced brackets for rotation and longitudinal shifting movement, a collar on said rod intermediate said brackets, an extension on the lower bracket, a bell crank pivotally mounted on said extension and having a bifurcated end engaging said collar, an arm secured to the lower end of said rod for conjoint rotation therewith, flexible motion transmitting rods connected to said bell crank and said arm, and tubular conduits for said rods clamped on said extension.

LEO A. BIXBY.